March 31, 1953     F. E. ANDERSEN     2,632,951

DRILLING AND CUTTING TOOL

Filed Sept. 11, 1950

Inventor
Frederick E. Andersen
By Williamson & Williamson
Attorneys

Patented Mar. 31, 1953

2,632,951

UNITED STATES PATENT OFFICE 2,632,951

DRILLING AND CUTTING TOOL

Frederick E. Andersen, Red Wing, Minn.

Application September 11, 1950, Serial No. 184,275

5 Claims. (Cl. 32—48)

This invention relates to a dental and surgical drilling and cutting tool.

It has long been a problem in drilling out cavities in teeth and in drilling holes in bone structure to prevent heat from forming due to the friction of the high speed drilling apparatus now used for such purposes.

It is an object of my invention to provide a relatively simple drilling tool adapted to be attached to conventional dental hand pieces to be rotated thereby and to drill in bone structure such as teeth at relatively high speeds to quickly cut away the bone structure without producing a great amount of heat.

More specifically it is an object to provide a drilling tool or bit in which the drilling element thereof is formed from a plurality of substantially parallel resilient tines tapered toward the center of the group to produce a tapered cutting point.

It is a further object to provide a drilling or cutting element having a plurality of resilient, elongated substantially parallel tines having their end portions sharpened to form a plurality of individual cutting points disposed around the periphery of a circle to permit each element to individually twist during the cutting operation, so that each cutting point is in cutting position for only a portion of each revolution thereby permitting intermittent cooling of the cutting point during the cutting and drilling operation.

These and other objects and advantages of my invention will more fully appear from the following description made in connection with the accompanying drawings wherein like reference characters refer to similar parts throughout the several views, and in which.

Figure 1:
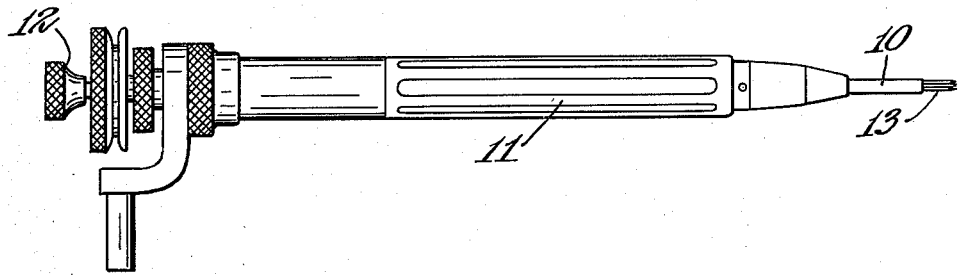
Fig. 1 is a side elevational view of my improved drilling and cutting tool mounted in a conventional dental hand piece.
Figure 2:
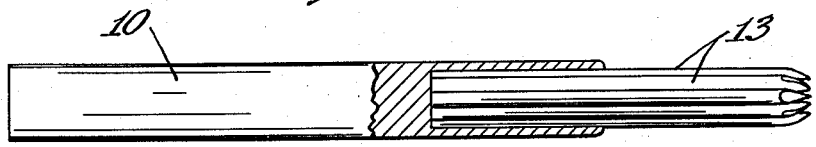
Fig. 2 is an enlarged side elevational view of my cutting tool.
Figure 4:
Fig. 4 is a top plan view of one of the tines.
Figure 3:
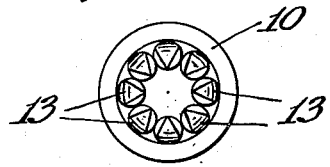
Fig. 3 is an end elevational view thereof.
Figure 5:
Fig. 5 is a side elevational view of the tine shown in Fig. 4.
Figure 6:
Fig. 6 is an end elevational view thereof.

As illustrated in the accompanying drawings I provide a cutting or drilling bit having a shank 10 adapted to be mounted at one end in a conventional hand piece such as the dental hand piece 11 having a suitable gripping chuck mechanism adapted to be actuated by the knurled control shaft and knob 12. The cutting element of the tool is made up of a plurality of substantially parallel circumferentially arranged highly resilient tines 13. In the form shown each of these tines is substantially circular in cross section and is tapered from the outer side portion to the inner side portion, as best shown in Fig. 5. This produces a tapered point at the cutting end of the circumferentially arranged group of tines.

When this tapered cutting point is engaged against a bone structure such as a tooth and is rotated at a relatively high speed each tine element will shift during the cutting operation and the friction thereon will twist the same somewhat and shift certain of said tines outwardly into cutting position. The structure of the cutting element is such that none of the tines is in cutting position during any one revolution of the cutting bit but the tines are constantly shifting out into cutting position and back into retracted position. It should be noted that this intermittent cutting action of the respective tines permits intermittent cooling thereof and the provision of individual tines prevents any great amount of heat transfer from one tine to the other thereby maintaining the heat generated by the cutting action at an absolute minimum. I have obtained extremely efficient results during my wide-spread experimentation with this cutting and drilling tool and have found that an extremely smooth hole may be drilled in bone structure without producing any frayed ends when the drill cuts through the far side of a bone structure.

It will be seen that I have provided extremely simple yet highly efficient drilling and cutting tool in which the temper of the tines can be maintained indefinitely due to the minimum heat generated during the drilling operation. Also the resilient action of each tine substantially cushions the drilling action and materially reduces the vibration and noise usually caused in conventional drills. A faster cut is permitted due to the reduction in heat generated and the drilling operation on the teeth of a patient has been found to be much less disagreeable than has been formerly experienced.

It will, of course, be understood that any variations in the size or number of tines in my improved cutting and drilling tool may be made without departing from the scope of my invention.

What I claim is:

1. In a drilling tool, a plurality of elongated individual pointed resilient drilling and cutting tines arranged in a group and disposed in closely associated side by side relationship to each other and circumferentially arranged around an open central portion, and means immovably holding upper portions of the tines against transverse movement relative to each other, lower portions of the tines between the said means and their lower ends being of appreciable length and freely movable relative to each other to permit individual flexing movement of the said lower portions radially of the group and thereby allow the said lower portions to individually yield in a direction radially of the group during a drilling and cutting operation to facilitate undercutting with the tines while drilling an opening.

2. The structure set forth in claim 1 and the pointed cutting ends of said tines being tapered from the outside thereof toward the inside to provide a generally tapered cutting point produced by the entire group of circumferentially arranged tines at the cutting end of the tool.

3. A dental drilling tool comprising a shank formed with a longitudinally extending axially aligned socket leading from one end of the shank and being circular in cross section, and a group of tines of an even length each consisting of a resilient metal rod circular in cross section and of appreciably greater length than the depth of the socket, said tines being fitted into said socket through the open end thereof and arranged in a circular path in contact with the annular wall of the socket and in side by side engagement with each other about an open central space and securely anchored in said socket, said tines having portions projecting an appreciable distance from the socket and yieldable relative to each other radially of the socket and thereby individually movable from a retracted position to an expanded position, and said tines having their outer ends beveled from their outer sides and along their sides contacting with each other and thereby each formed with a triangular tooth tapered to a point at its end and disposed radially of the shank and having cutting edges along its opposite sides.

4. A dental drilling tool comprising a shank formed with a longitudinally extending axially aligned socket leading from one end of the shank and being circular in cross section, and a group of tines of an even length each consisting of a resilient metal rod circular in cross section and of appreciably greater length than the depth of the socket, said tines being fitted into said socket through the open end thereof and arranged in a circular path in contact with the annular wall of the socket and in side by side engagement with each other, said tines having portions projecting an appreciable distance from the socket to provide an open central space of appreciable length surrounded by said tines, said tines being yieldable relative to each other radially of the socket and thereby individually movable from a retracted position to an expanded position, and said tines having their outer ends tapered and thereby formed with teeth having sharp side edges.

5. A dental drilling tool comprising a shank having one end portion formed with a longitudinally extending socket axially aligned with the shank and leading from the said end of the shank, said socket being circular in cross section, and a group of tines each consisting of a highly resilient metal rod circular in cross section, said tines being fitted into said socket through the open end thereof and arranged in a circular path disposing adjoining tines in side by side contact with each other and also disposing each tine in engagement with the wall of the socket for the full depth thereof, said tines being of appreciably greater length than the socket and projecting outwardly from the open end of the socket, and said tines having their outer ends beveled longitudinally from their outer side portions and in opposite directions from their contacting side portions and thereby forming the tines with teeth at their outer ends triangular in cross section and each provided with a triangular outer side face curved longitudinally at an inward incline to its tip, the said teeth having their tips presented inwardly radially of the group of tines and side faces of the teeth intersecting side edges of the outer triangular faces and forming cutting edges.

FREDERICK E. ANDERSEN.

REFERENCES CITED

The following references are of record in the file of this patent:

UNITED STATES PATENTS

| Number | Name | Date |
| --- | --- | --- |
| 533,738 | Philbrook | Feb. 5, 1895 |
| 940,058 | Quigley | Nov. 16, 1909 |
| 2,174,339 | Poletis | Sept. 26, 1939 |

FOREIGN PATENTS

| Number | Country | Date |
| --- | --- | --- |
| 350,823 | Germany | Feb. 22, 1921 |